(12) United States Patent
Asame et al.

(10) Patent No.: US 12,037,959 B1
(45) Date of Patent: Jul. 16, 2024

(54) SEAL STRUCTURE OF BELT COVER FOR INTERNAL COMBUSTION ENGINE

(71) Applicant: HONDA MOTOR CO., LTD., Tokyo (JP)

(72) Inventors: Koichiro Asame, Tokyo (JP); Motoyuki Sunaoka, Tokyo (JP); Osamu Yoda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/557,074

(22) PCT Filed: Apr. 25, 2022

(86) PCT No.: PCT/JP2022/018689
§ 371 (c)(1),
(2) Date: Oct. 25, 2023

(87) PCT Pub. No.: WO2022/230799
PCT Pub. Date: Nov. 3, 2022

(30) Foreign Application Priority Data

Apr. 30, 2021 (JP) .................................. 2021-077127

(51) Int. Cl.
*F02F 11/00* (2006.01)
*F02B 67/06* (2006.01)
*F16M 1/026* (2006.01)

(52) U.S. Cl.
CPC ............ *F02F 11/002* (2013.01); *F02B 67/06* (2013.01); *F16M 1/026* (2013.01)

(58) Field of Classification Search
CPC ......... F02F 11/002; F02B 67/06; F16M 1/026
See application file for complete search history.

(56) References Cited

U.S. PATENT DOCUMENTS

| 4,998,515 A | * | 3/1991 | Carvalho | ............... F02F 7/0046 123/195 C |
| 5,445,547 A | * | 8/1995 | Furukawa | ............. F02B 61/045 440/88 R |

(Continued)

FOREIGN PATENT DOCUMENTS

| JP | 61-179351 U | 11/1986 |
| JP | 62-47751 U | 3/1987 |

(Continued)

OTHER PUBLICATIONS

International Search Report issued in corresponding International Application No. PCT/JP2022/018689, dated Jul. 12, 2022, pp. 1-2, English Translation.

*Primary Examiner* — Kurt Philip Liethen
(74) *Attorney, Agent, or Firm* — Carter, DeLuca & Farrell LLP (57) ABSTRACT

Provided is a seal structure of a belt cover for an internal combustion engine having excellent sealability on the composite mating surfaces of an upper cover, a lower cover, and an inside cover constituting the belt cover. The seal structure of the belt cover for the internal combustion engine according to the present invention includes: an inside cover member disposed on a side of the body of the internal combustion engine; and an outside cover member disposed on a side opposite to the body of the internal combustion engine, and accommodating a timing belt TB in a liquid-tight state together with the inside cover member. The outside cover member is divided into an upper outside cover 4 and a lower outside cover 5. A first seal is formed between the upper outside cover 4 and the inside cover member. A second seal is formed between the upper outside cover 4 and the lower outside cover 5. At a boundary between the first seal and the second seal, a seating portion 36 on which a lower end 32*a* of a seal member 32 of the first seal is seated is formed by (Continued)

an end upper surface of a male portion 33 of the lower outside cover 5 and an end upper surface of a projecting portion 35 of the inside cover member flush with the end upper surface of the male portion 33.

3 Claims, 8 Drawing Sheets

(56) References Cited

U.S. PATENT DOCUMENTS

| | | | |
|---|---|---|---|
| 10,253,867 B2* | 4/2019 | Lee | F02B 67/06 |
| 2010/0147234 A1* | 6/2010 | Sakata | F02M 35/1211 |
| | | | 123/41.7 |
| 2011/0227295 A1* | 9/2011 | Watanabe | F16J 15/062 |
| | | | 277/591 |
| 2017/0292601 A1 | 10/2017 | Lee et al. | |
| 2017/0298864 A1* | 10/2017 | Ito | F02F 11/002 |

FOREIGN PATENT DOCUMENTS

| | | |
|---|---|---|
| JP | H08-158886 A | 6/1996 |
| JP | H08-210511 A | 8/1996 |

\* cited by examiner

SEAL STRUCTURE OF BELT COVER FOR INTERNAL COMBUSTION ENGINE

CROSS-REFERENCE TO RELATED APPLICATION (S)

This is a national stage application filed under 37 U.S.C. 371 based on International Patent Application No. PCT/JP2022/018689, filed Apr. 25, 2022, which claims priority to Japanese Patent Application No. 2021-077127 filed Apr. 30, 2021, the disclosures of which are incorporated herein by reference in their entireties.

TECHNICAL FIELD

The present invention relates to a seal structure of a belt cover for an internal combustion engine for protecting a timing belt attached to the internal combustion engine.

BACKGROUND ART

Some internal combustion engines for vehicles use a timing belt (or a transmission band such as a timing chain) to transmit rotational power of the crankshaft in conjunction with the camshaft. Here, in order to protect the timing belt from water and dust, a belt cover that covers the timing belt can be disposed on the cylinder block of the internal combustion engine. In general, the belt cover is required to have sealability for waterproof and dustproof.

In addition, the belt cover needs to be detached from the cylinder block as necessary for inspection and replacement of the timing belt, for example. Therefore, the belt cover is required to have easiness of attachment and detachment in addition to sealability for waterproof and dustproof.

The belt cover in Patent Literature 1 includes an upper cover that covers the substantially upper half of the timing belt including the pulley on the camshaft from outside (opposite side of the cylinder block with respect to the timing belt), a lower cover that covers the substantially lower half of the timing belt including the pulley on the crankshaft from outside, and an inside cover (under cover) that covers the timing belt from inside (cylinder block side with respect to the timing belt). Further, the lower cover is divided into two parts that have mating surfaces with a seal structure so that the two parts can be attached and detached separately.

CITATION LIST

Patent Literature

Patent Literature 1: Japanese Utility Model Publication No. 61-179351

SUMMARY OF INVENTION

Technical Problem

Structures such as that in Patent Literature 1, in which the belt cover is divided into the upper cover, the lower cover, and the inside cover, are likely to have a problem in sealability at the mating surfaces of these three members (connecting surface between the mating surfaces of the upper cover and the lower cover and the mating surfaces of the upper cover, the lower cover, and the inside cover). In particular, in cases where seals with seal members (for example, packing) and seals (what is called labyrinth seals) produced by engaging male and female shapes provided directly on members with each other are used in combination as seals between the respective members, a structure for securing sealability at the boundaries between different seals is required. However, Patent Literature 1 does not take any measure for seals on the composite mating surfaces of the respective members.

In addition, from the camshaft disposed in the belt cover, oil (engine oil) from the valve mechanism including the camshaft leaks little by little. Such oil may adhere to the timing belt and cause deterioration or breakage of the timing belt. Therefore, a structure for reliably and quickly discharging leaking oil out of the belt cover is required. On the other hand, if an opening is provided in the belt cover, foreign matter such as water and dust may enter through the opening. Therefore, there is a demand for a seal structure capable of appropriately discharging oil leaking into the belt cover to outside and effectively preventing entry of foreign matter.

The present invention has been made to solve such a problem, and an object thereof is to provide a seal structure of a belt cover for an internal combustion engine having excellent sealability on the composite mating surfaces of an upper cover, a lower cover, and an inside cover constituting the belt cover. Another object is to provide a seal structure of a belt cover for an internal combustion engine capable of appropriately discharging oil discharged from the camshaft to outside and effectively preventing entry of foreign matter.

Solution to Problem

In order to achieve this object, an invention according to claim 1 of the present invention is a seal structure of a belt cover for an internal combustion engine 1, the internal combustion engine 1 including a timing belt TB disposed on one end side in a cylinder bore array direction of a body of the internal combustion engine and drivingly coupling a crankshaft and a camshaft, the seal structure of the belt cover accommodating the timing belt TB in a liquid-tight state, the seal structure of the belt cover including: an inside cover member (front inside cover 2 in an embodiment (the same applies hereinafter)) disposed on a side of the body of the internal combustion engine with respect to the timing belt TB; and an outside cover member (front outside cover 6) disposed on a side opposite to the body of the internal combustion engine with respect to the timing belt TB, and accommodating the timing belt TB in a liquid-tight state together with the inside cover member, wherein the outside cover member is divided into at least an upper outside cover 4 and a lower outside cover 5 in a cylinder axial direction, the upper outside cover 4 and the inside cover member both have, on an outer periphery, mating surfaces that are fit with each other, and a first seal in the cylinder bore array direction is formed by a seal member 32 accommodated in a seal member accommodating groove 31 formed in the mating surface of the upper outside cover 4, the upper outside cover 4 and the lower outside cover 5 respectively have, at a lower end and an upper end, an upper mating surface and a lower mating surface that are fit with each other, and a second seal in the cylinder axial direction is formed by a male portion 33 formed on the lower mating surface and a female groove 34 formed on the upper mating surface and with which the male portion 33 is engaged, a projecting portion 35 is formed on the inside cover member at a boundary between the first seal and the second seal, the projecting portion having an end upper surface flush with an end upper surface of the male portion 33 of the lower outside cover 5, and a seating portion 36 on which a lower end 32a of the seal member 32 accommodated in the seal member accommodating groove 31 is seated is formed by the end upper surface of the male portion 33 and the end upper surface of the projecting portion 35 of the inside cover member.

In the seal structure of the belt cover for the internal combustion engine, at the boundary between the first seal between the upper outside cover and the inside cover member and the second seal between the upper outside cover and the lower outside cover, the end upper surface of the projecting portion formed on the inside cover member and the end upper surface of the male portion of the lower outside cover are formed to be flush with each other, and a planar seating portion for the seal member is formed. As a result, the seal member provided on the upper outside cover can be seated on the seating portion with stable and excellent sealability, and thus it is possible to provide the seal structure of the belt cover for the internal combustion engine having excellent sealability on the composite mating surfaces of the upper outside cover, the lower outside cover, and the inside cover member.

An invention according to claim 2 of the present invention is the seal structure of the belt cover for the internal combustion engine according to claim 1, wherein an end of the seal member accommodating groove 31 and an end of the female groove 34 are continuous with each other in a continuous portion 39, and in the continuous portion 39, a lower end of a wall portion forming a groove extends toward the lower outside cover 5 beyond the lower end 32a of the seal member 32.

With this configuration, because the lower end of the seal member is accommodated in the groove at the continuous portion of the upper outside cover between the end of the seal member accommodating groove and the end of the female groove, at the time of assembling the upper outside cover, the movement and deformation of the lower end of the seal member are restricted by the wall portion of the groove, and the seal member can be seated on the seating portion with more stable and excellent sealability.

An invention according to claim 3 of the present invention is the seal structure of the belt cover for the internal combustion engine according to claim 1 or 2, wherein the inside cover member is attached to at least a side surface of a cylinder head CH of the internal combustion engine 1 below camshafts 11 and 12, a third seal is formed between the inside cover member and the side surface of the cylinder head CH by a second seal member (back surface seal member 42) accommodated in a second seal member accommodating groove (back surface seal member accommodating groove 41) formed at an upper end of the inside cover member, the second seal member accommodating groove constitutes a guide portion that guides oil discharged from the camshafts 11 and 12, an opening portion 43 for discharging the oil guided to outside is formed at a lowermost site of the second seal member, and a rib 44 for preventing entry of foreign matter is provided at a position facing the opening portion 43 of the inside cover member.

With this configuration, oil discharged from the camshafts is guided to the opening portion by the second seal member accommodating groove provided in the inside cover member and is discharged to outside, and foreign matter from outside can be prevented from entering the belt cover by the rib for preventing entry of foreign matter. Therefore, it is possible to provide the seal structure of the belt cover for the internal combustion engine capable of appropriately discharging oil discharged from the camshafts to outside and effectively preventing entry of foreign matter.

DESCRIPTION OF EMBODIMENTS

Hereinafter, a preferred embodiment of a seal structure of a belt cover for an internal combustion engine 1 according to the present invention will be described in detail with reference to the drawings. The present embodiment describes an example in which the internal combustion engine 1 is longitudinally mounted. In addition, the description is based on the assumption that the direction in which a crankshaft 10 and camshafts 11, 12, 13, and 14 of the internal combustion engine 1 extend is the axial direction, the vertically upward and vertically downward direction is the vertical direction, and the front-rear direction of the vehicle on which the internal combustion engine 1 is longitudinally mounted is the front-rear direction.

Figure 1:
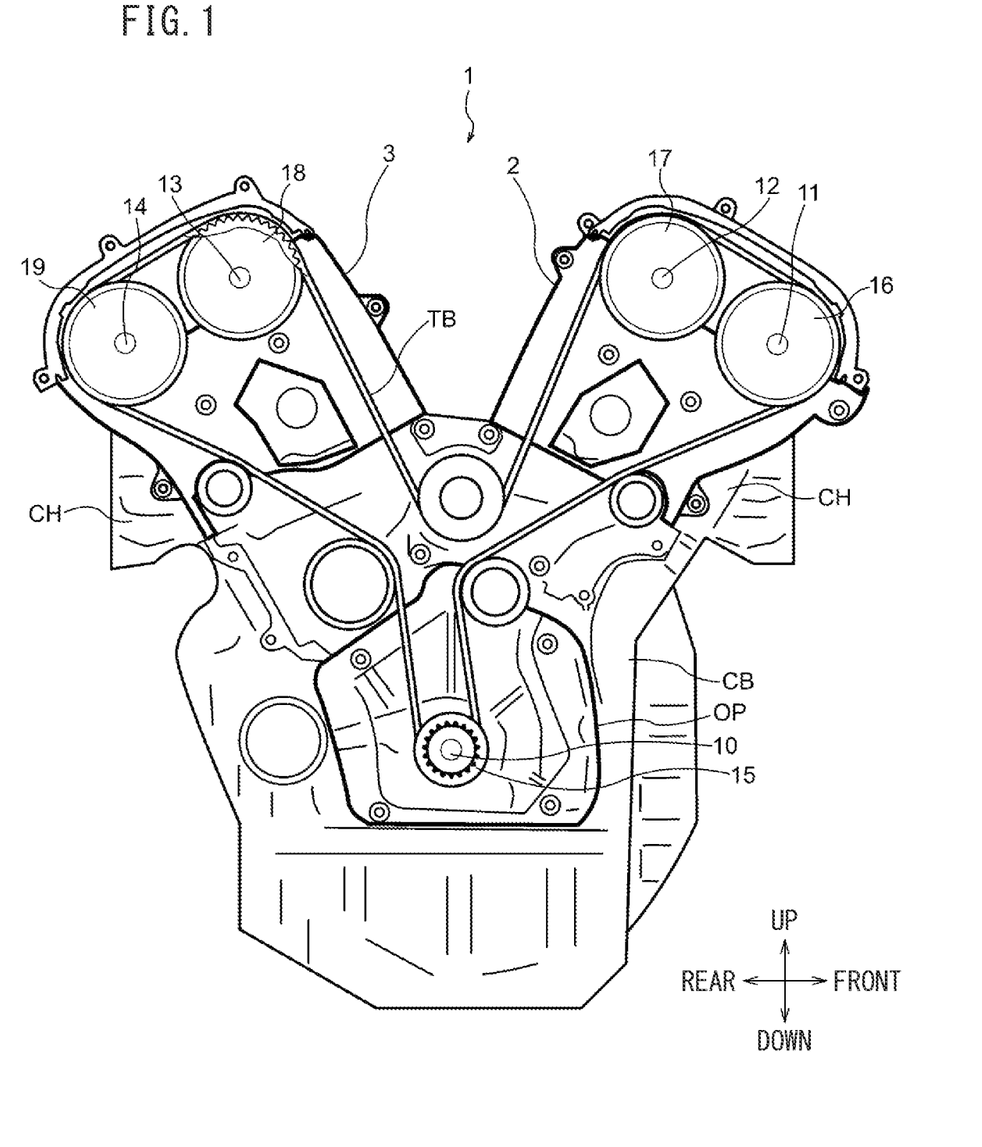
FIG. 1 is a diagram illustrating a timing belt and a belt cover disposed inside the timing belt in an internal combustion engine.
Figure 2:
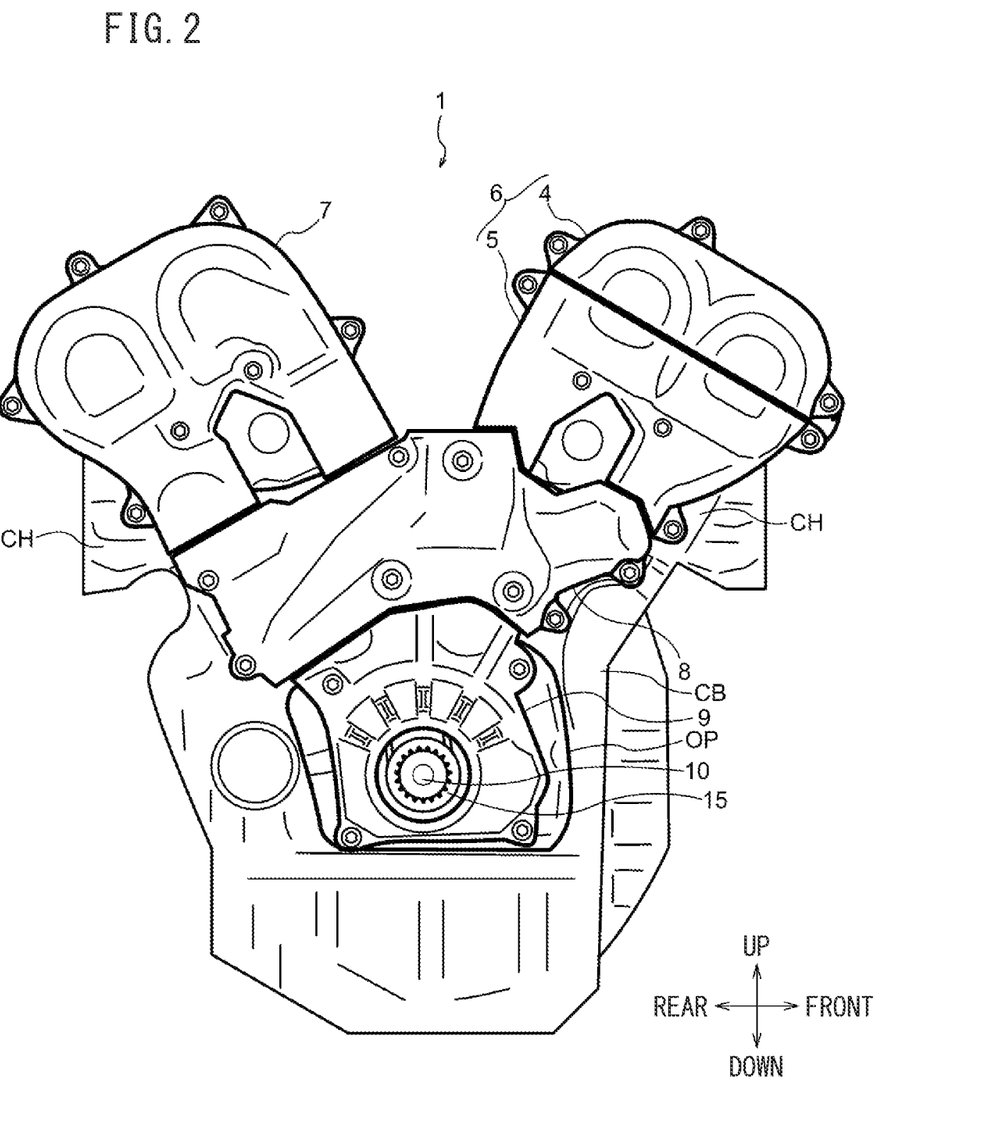
FIG. 2 is a diagram illustrating the belt cover disposed outside the timing belt in the internal combustion engine.

An outline of the structure of a timing belt TB of the internal combustion engine 1 and the seal structure of the belt cover for the internal combustion engine 1 will be described with reference to FIGS. 1 and 2. FIG. 1 is a diagram illustrating the timing belt TB and the belt cover disposed inside the timing belt TB in the internal combustion engine 1. FIG. 2 is a diagram illustrating the belt cover disposed outside the timing belt TB in the internal combustion engine 1. Here, the terms "inside" and "outside" respectively refer to the side close to a cylinder head CH, CH or a cylinder block CB of the internal combustion engine 1 with respect to the timing belt TB, and the opposite side thereof.

As illustrated in FIG. 1, the crankshaft 10 and the camshafts 11, 12, 13, and 14 are disposed in a projecting manner in the cylinder head CH, CH and the cylinder block CB on one side surface of the internal combustion engine 1. The crankshaft 10 and the camshafts 11, 12, 13, and 14 are connected to drive pulleys 15, 16, 17, 18, and 19, respectively. The timing belt TB is looped over the drive pulleys 15, 16, 17, 18, and 19 and other pulleys. As a result, the crankshaft 10 and the camshafts 11, 12, 13, and 14 rotate in conjunction with each other.

As illustrated in FIGS. 1 and 2, the timing belt TB is protected by the belt cover. The belt cover is assembled to one side surface of the body of the internal combustion engine. The belt cover according to the present embodiment includes a front inside cover 2, a rear inside cover 3, an upper outside cover 4, a lower outside cover 5, a rear outside cover 7, a side mount bracket 8, and a lower cover 9.

A procedure for assembling the belt cover according to the present embodiment will be described with reference to FIGS. 1 and 2. First, as a premise, as illustrated in FIG. 1, the front inside cover 2 and the rear inside cover 3 are assembled to the cylinder head CH, CH before the timing belt TB is assembled to the internal combustion engine 1. In addition, an oil pump case OP is assembled to the cylinder block CB.

As illustrated in FIG. 2, the lower cover 9 is attached around the crankshaft 10, and the side mount bracket 8 is attached adjacent to and above the lower cover 9. Thereafter, the rear outside cover 7 is attached adjacent to and above the side mount bracket 8 so as to cover the outside of the drive pulleys 18 and 19 on the camshafts 13 and 14. In addition, the lower outside cover 5 is attached adjacent to and above the side mount bracket 8, and the upper outside cover 4 is attached adjacent to and above the lower outside cover 5. Here, the upper outside cover 4 and the lower outside cover 5 integrally constitute a front outside cover 6 that covers the outside of the drive pulleys 16 and 17 on the camshafts 11 and 12. The front outside cover 6 is disposed in front of the rear outside cover 7.

Figure 3:
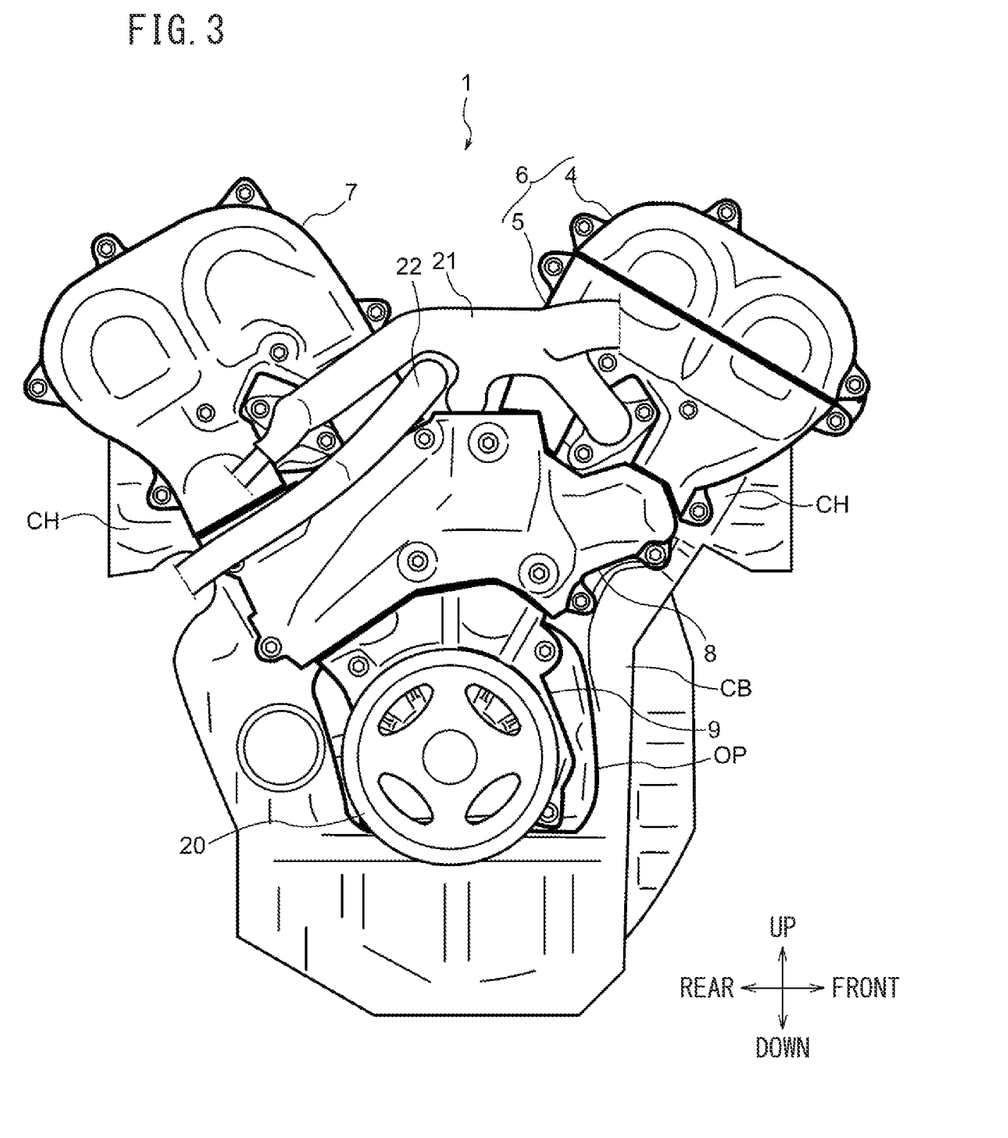
FIG. 3 is a side view of the internal combustion engine assembled with the belt cover.

FIG. 3 is a side view of the internal combustion engine 1 assembled with the belt cover. As illustrated in FIG. 3, with the belt cover assembled, a crank pulley 20 is connected to the crankshaft 10, a pipe 21 is disposed outside the front outside cover 6 and the rear outside cover 7, and a pipe 22 is disposed outside the side mount bracket 8.

Next, in the seal structure of the belt cover for the internal combustion engine 1 according to the present embodiment, the front outside cover 6, the front inside cover 2, and the peripheral structure thereof will be described in detail. As described above, the front outside cover 6 includes the upper outside cover 4 and the lower outside cover 5. The lower end of the lower outside cover 5 is provided with a female groove (not illustrated) for attachment to the side mount bracket 8, and a seal member (not illustrated) accommodated in a seal member accommodating groove (not illustrated) at the upper end of the side mount bracket 8 is fitted into the female groove to form a seal in the vertical direction. In addition, both sides of the lower outside cover 5 are provided with female grooves 37 for attachment to the front inside cover 2, and the female grooves 37 are engaged with male portions 38 provided on both sides of the front inside cover 2 to form a seal in the axial direction. The lower outside cover 5 is fixed to the front inside cover 2 using a fastening member such as a bolt.

The lower end of the upper outside cover 4 is provided with a female groove 34 for attachment to the lower outside cover 5, and the female groove 34 is engaged with a male portion 33 provided at the upper end of the lower outside cover 5 to form a seal in the vertical direction. A mating surface for attachment to the front inside cover 2 and the cylinder head CH is formed on the outer periphery of the upper outside cover 4 except at the lower end, and a seal member accommodating groove 31 for accommodating a seal member 32 is formed on the mating surface. A mating surface corresponding to the mating surface of the upper outside cover 4 is formed on the front inside cover 2 and the cylinder head CH, and the seal member 32 of the upper outside cover 4 is pressed against the mating surface to form a seal in the axial direction. The upper outside cover 4 is fixed to the cylinder head CH using a fastening member such as a bolt.

Figure 4:
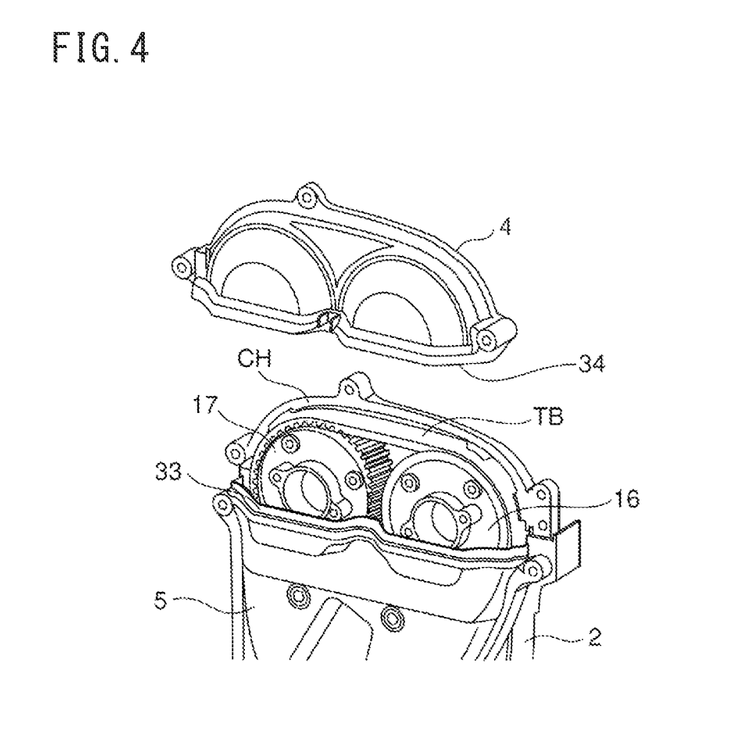
FIG. 4 is a view illustrating the belt cover with the upper outside cover removed.
Figure 5:
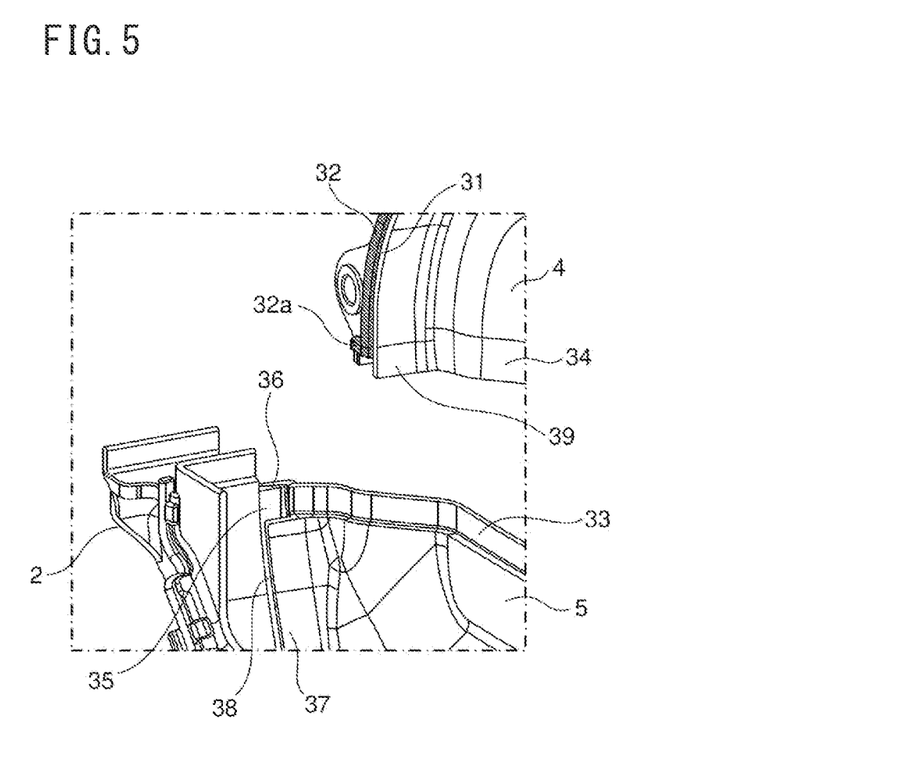
FIG. 5 is a view illustrating a seal structure for the mating surfaces of the upper outside cover, the lower outside cover, and the front inside cover.

Next, with reference to FIGS. 4 to 6, the seal structure at the mating surfaces of the three members, namely the upper outside cover 4, the lower outside cover 5, and the front inside cover 2, will be described. FIG. 4 is a perspective view illustrating the belt cover with the upper outside cover 4 removed. In the belt cover according to the present embodiment, it is possible to remove only the upper outside cover 4 without removing other components of the belt cover, which allows for very easy inspection of the oil seals of the camshafts 11 and 12, the timing belt TB, and the like.

Meanwhile, in the present embodiment, in order to facilitate attachment and detachment of each component of the belt cover, seals with seal members (for example, packing) and seals produced by engaging male and female shapes between members with each other (what is called labyrinth seals) are used at different sites. Therefore, it is important to provide a seal structure having high waterproof and dustproof performance at the boundaries between a plurality of seals. FIG. 5 is a perspective view of the mating surfaces of the upper outside cover 4, the lower outside cover 5, and the front inside cover 2 in the present embodiment as viewed from the inside.

The male portion 33 at the upper end of the lower outside cover 5 is formed substantially over the entire region of the upper end of the lower outside cover 5, and its left and right ends are formed in a slightly thicker shape in the vicinity of the female grooves 37 for attachment to the front inside cover 2. The male portions 38 provided on both sides of the front inside cover 2 extend to the vicinity of the upper end of the front inside cover 2 to constitute a projecting portion 35, and the projecting portion 35 is formed such that its upper surface is flush with the end upper surface of the male portion 33 of the lower outside cover 5.

The end of the male portion 33 of the lower outside cover 5 is disposed adjacent to the projecting portion 35 of the front inside cover 2, and a flat surface is formed by the flush upper surfaces of the two. This flat surface functions as a seating portion 36 on which a lower end 32a of the seal member 32 accommodated in the seal member accommodating groove 31 of the upper outside cover 4 is seated.

In the present embodiment, the male portions 38 provided on both sides of the front inside cover 2 extend to the vicinity of the upper end of the front inside cover 2 to form the projecting portion 35, which constitutes the seating portion 36 together with the end of the male portion 33 of the lower outside cover 5. However, for example, another sealing structure such as a female groove may be provided instead of the male portions 38, in which case a projecting portion can be separately provided to constitute the seating portion 36 together with the end of the male portion 33 of the lower outside cover 5.

The end of the seal member accommodating groove 31 provided on the outer periphery of the upper outside cover 4 is formed continuously with the end of the female groove 34 provided at the lower end. That is, the wall portion constituting the seal member accommodating groove 31 extends to a continuous portion 39 joining the end of the female groove 34, and extends from there substantially over the entire region of the lower end as the wall portion constituting the female groove 34.

The lower end 32a of the seal member 32 is formed wider than other portions. As a result, the lower end 32a of the seal member 32 can be stably seated on the seating portion 36, so that high sealability can be obtained. In addition, in order to accommodate the lower end 32a formed wider, the end of the seal member accommodating groove 31 is formed with a wider groove width than other portions.

Further, at the end of the seal member accommodating groove 31, that is, at the continuous portion 39, the lower end of the wall portion constituting the groove extends toward the lower outside cover 5 (that is, downward) beyond the position at which the lower end 32a of the seal member 32 is accommodated. Therefore, when the upper outside cover 4 is attached to the lower outside cover 5 and the front inside cover 2, the movement and deformation of the lower end 32a of the seal member 32 are restricted by the wall portion of the seal member accommodating groove 31, so that the lower end 32a can be seated on the seating portion 36 in an appropriate position, orientation, and shape.

Figure 6:
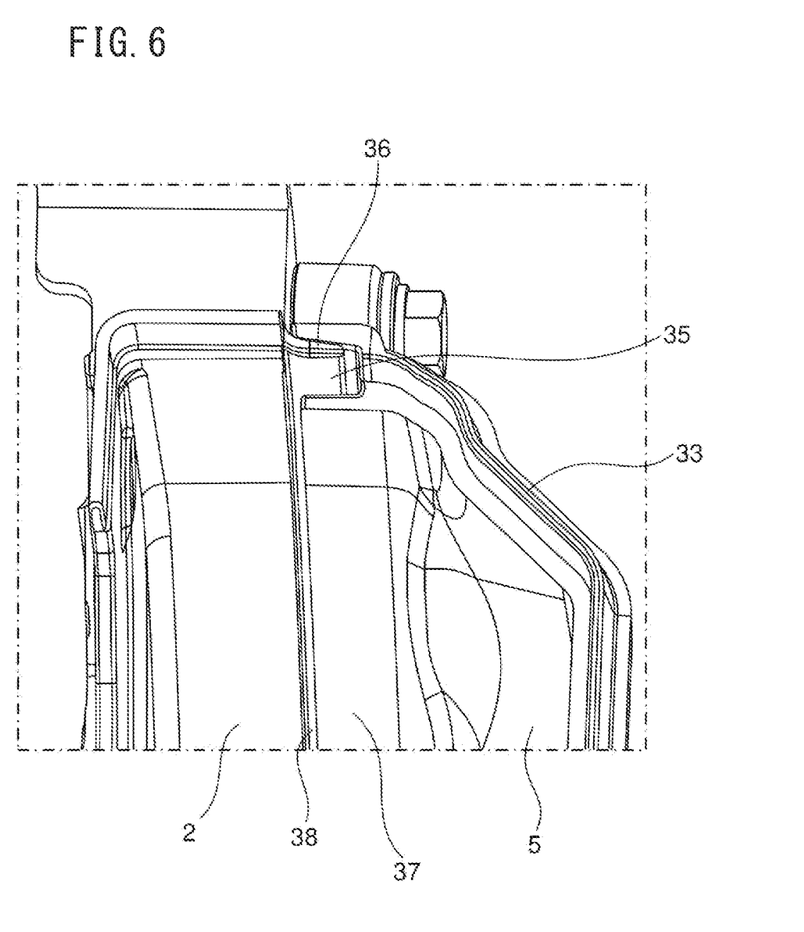
FIG. 6 is a view illustrating a seating portion on which the lower end of the seal member is seated.

FIG. 6 is a perspective view of the seating portion 36 as viewed from the rear. The upper surface of the projecting portion 35 of the front inside cover 2 does not project to form a corner with the wall portion of the front inside cover 2, but is continuously formed in a gentle curved surface from the wall portion of the front inside cover 2. As a result, as the seal member 32 is seated on the seating portion 36, the seal member 32 and the seating portion 36 are brought into closer contact with each other, so that generation of a gap can be prevented and high sealability can be obtained.

Figure 7:
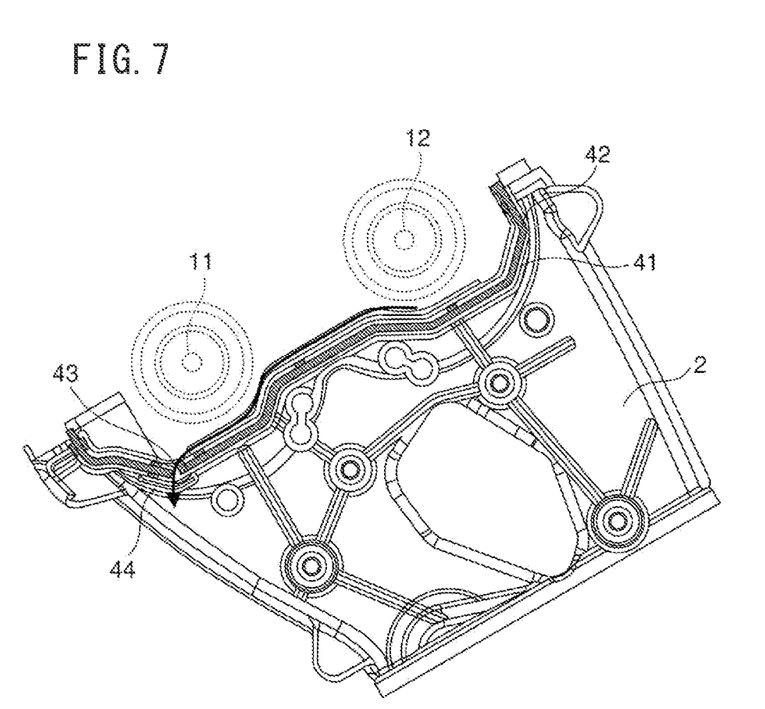
FIG. 7 is a view illustrating a seal structure on the back surface of the front inside cover.

Next, the seal structure between the front inside cover 2 and the cylinder head CH will be described with reference to FIGS. 7 and 8. As described above, the front inside cover 2 is assembled to the cylinder head CH of the internal combustion engine 1. FIG. 7 is a rear view of the front inside cover 2 as viewed from the farther side to the nearer side in the axial direction. In the drawing, the positions of the camshafts 11 and 12 projecting into the belt cover are indicated by broken lines. The upper end of the front inside cover 2 has a shape conforming to the camshafts 11 and 12 disposed above the front inside cover 2. The seal between the front inside cover 2 and the cylinder head CH is formed by pressing a back surface seal member 42 accommodated in a back surface seal member accommodating groove 41 provided at the upper end of the front inside cover 2 against the corresponding mating surface of the cylinder head CH.

From the oil seals (not illustrated) of the camshafts 11 and 12, oil (engine oil) from the valve mechanism including the camshafts leaks little by little. Leaking oil may adhere to the timing belt TB and cause deterioration or breakage of the timing belt TB. Therefore, a structure for reliably and quickly discharging leaking oil out of the belt cover is required. In the present embodiment, the wall portion constituting the back surface seal member accommodating groove 41 of the front inside cover 2 functions as a guide portion that guides leaking oil to an opening portion 43 described later.

That is, oil leaking from the oil seals of the camshafts 11 and 12 drops to the upper wall portion of the back surface seal member accommodating groove 41 of the front inside cover 2 located immediately below the camshafts 11 and 12. Dropped oil is transmitted through a plurality of inclined surfaces provided on the back surface seal member accommodating groove 41, and is guided to the opening portion 43 formed at the lowermost position of the back surface seal member accommodating groove 41.

Figure 8:
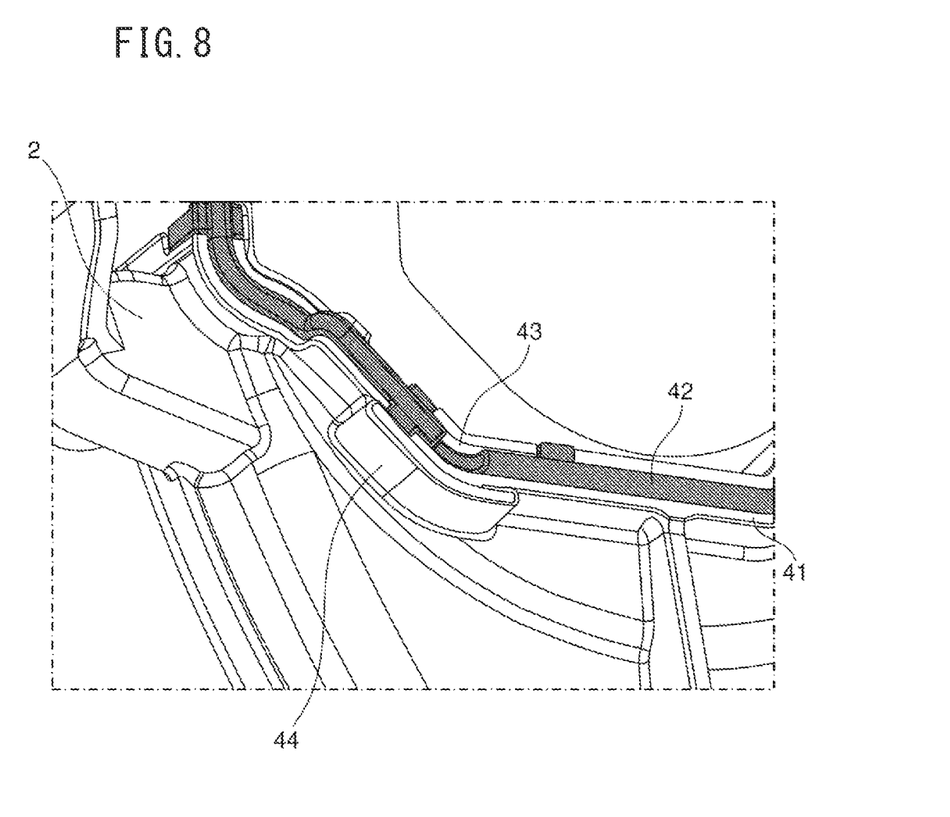
FIG. 8 is a view illustrating an opening portion and a rib for preventing entry of foreign matter on the front inside cover.

FIG. 8 is an enlarged view illustrating a structure around the opening portion 43 of the front inside cover 2. The opening portion 43 is formed by cutting out a part of the back surface seal member 42 accommodated in the back surface seal member accommodating groove 41. Oil flowing along the inclined surfaces of the back surface seal member accommodating groove 41 is discharged out of the belt cover through the opening portion 43.

The size of the opening portion 43, that is, the size of the cutout provided in the back surface seal member 42, is desirably the minimum size that allows guided oil to smoothly pass through. The opening portion 43 is desirably formed as an opening in the vertical direction. By setting the size and orientation of the opening portion 43 in this manner, it is possible to minimize entry of foreign matter such as water and dust into the belt cover through the opening portion 43.

In the present embodiment, in order to further reduce entry of foreign matter through the opening portion 43, a rib 44 for preventing entry of foreign matter is provided at a position facing the opening portion 43 of the front inside cover 2, that is, at a position substantially immediately below the opening portion 43 on the back surface of the front inside cover 2. The rib 44 extends to cover the opening portion 43 from below and laterally, and thus prevents entry of foreign matter through the opening portion 43.

Note that with the front inside cover 2 assembled to the cylinder head CH, the rib 44 does not completely close the opening portion 43, and a predetermined amount of clearance is set between the rib 44, the back surface seal member accommodating groove 41, and the cylinder head CH. Therefore, oil discharged from the opening portion 43 can be smoothly discharged to outside along the edge of the rib 44, and entry of foreign matter such as water and dust from outside can be effectively prevented by the rib 44 shielding the opening portion 43.

As described above, according to the present embodiment, the end upper surface of the projecting portion 35 formed on the front inside cover 2 and the end upper surface of the male portion 33 of the lower outside cover 5 are formed to be flush with and adjacent to each other, so that the planar seating portion 36 for the seal member 32 is formed. As a result, the seal member 32 can be seated on the seating portion 36 with stable and excellent sealability, and thus it is possible to provide the seal structure of the belt cover for the internal combustion engine having excellent sealability on the composite mating surfaces of the upper outside cover 4, the lower outside cover 5, and the front inside cover 2.

According to the present embodiment, in the continuous portion 39 of the upper outside cover 4 between the end of the seal member accommodating groove 31 and the end of the female groove 34, the lower end of the wall portion constituting the groove extends toward the lower outside cover 5 beyond the position at which the lower end 32a of the seal member 32 is accommodated, whereby the lower end 32a of the seal member 32 is accommodated in the groove. As a result, at the time of assembling the upper outside cover 4, the movement and deformation of the lower end 32a of the seal member 32 are restricted by the wall portion of the seal member accommodating groove 31, and the seal member 32 can be seated on the seating portion 36 with more stable and excellent sealability.

In addition, according to the present embodiment, oil discharged from the camshafts 11 and 12 is guided to the opening portion 43 by the back surface seal member accommodating groove 41 formed on the back surface of the front inside cover 2 and is discharged to outside, and foreign matter from outside can be prevented from entering the belt cover by the rib 44. Therefore, it is possible to provide the seal structure of the belt cover for the internal combustion engine capable of appropriately discharging oil discharged from the camshafts 11 and 12 to outside and effectively preventing entry of foreign matter.

Note that the present invention is not limited to the embodiment that has been described, and can be implemented in various aspects. In the above-described embodiment, the timing belt TB is used as a transmission band for drive transmission from the crankshaft 10 to the camshafts 11, 12, 13, and 14, but the present invention is not limited thereto. For example, an example of the transmission structure of the internal combustion engine 1 may be a chain transmission mechanism including a transmission band consisting of a timing chain and looped over a crankshaft drive wheel and a camshaft driven wheel consisting of a sprocket.

REFERENCE SIGNS LIST

- 1 internal combustion engine
- 2 front inside cover (inside cover member)
- 4 upper outside cover
- 5 lower outside cover
- 6 front outside cover (outside cover member)
- 10 crankshaft
- 11 camshaft
- 12 camshaft
- 31 seal member accommodating groove
- 32 seal member
- 32a lower end of seal member
- 33 male portion
- 34 female groove
- 35 projecting portion
- 36 seating portion
- 39 continuous portion
- 41 back surface seal member accommodating groove (second seal member accommodating groove)
- 42 back surface seal member (second seal member)
- 43 opening portion
- 44 rib for preventing entry of foreign matter
- CH cylinder head
- TB timing belt

The invention claimed is:

1. A seal structure of a belt cover for an internal combustion engine, the internal combustion engine including a timing belt disposed on one end side in a cylinder bore array direction of a body of the internal combustion engine and drivingly coupling a crankshaft and a camshaft, the seal structure of the belt cover accommodating the timing belt in a liquid-tight state, the seal structure of the belt cover comprising:

an inside cover member disposed on a side of the body of the internal combustion engine with respect to the timing belt; and an outside cover member disposed on a side opposite to the body of the internal combustion engine with respect to the timing belt, and accommodating the timing belt in a liquid-tight state together with the inside cover member, wherein the outside cover member is divided into at least an upper outside cover and a lower outside cover in a cylinder axial direction, the upper outside cover and the inside cover member both have, on an outer periphery, mating surfaces that are fit with each other, and a first seal in the cylinder bore array direction is formed by a seal member accommodated in a seal member accommodating groove formed in the mating surface of the upper outside cover, the upper outside cover and the lower outside cover respectively have, at a lower end and an upper end, an upper mating surface and a lower mating surface that are fit with each other, and a second seal in the cylinder axial direction is formed by a male portion formed on the lower mating surface and a female groove formed on the upper mating surface and with which the male portion is engaged, a projecting portion is formed on the inside cover member at a boundary between the first seal and the second seal, the projecting portion having an end upper surface flush with an end upper surface of the male portion of the lower outside cover, and a seating portion on which a lower end of the seal member accommodated in the seal member accommodating groove is seated is formed by the end upper surface of the male portion and the end upper surface of the projecting portion of the inside cover member.

2. The seal structure of the belt cover for the internal combustion engine according to claim 1, wherein an end of the seal member accommodating groove and an end of the female groove are continuous with each other in a continuous portion, and in the continuous portion, a lower end of a wall portion forming a groove extends toward the lower outside cover beyond the lower end of the seal member.

3. The seal structure of the belt cover for the internal combustion engine according to claim 1, wherein the inside cover member is attached to at least a side surface of a cylinder head of the internal combustion engine below the camshaft, a third seal is formed between the inside cover member and the side surface of the cylinder head by a second seal member accommodated in a second seal member accommodating groove formed at an upper end of the inside cover member, the second seal member accommodating groove constitutes a guide portion that guides oil discharged from the camshaft, an opening portion for discharging the oil guided to outside is formed at a lowermost site of the second seal member, and a rib for preventing entry of foreign matter is provided at a position facing the opening portion of the inside cover member.

\* \* \* \* \*